United States Patent
Willenegger et al.

(10) Patent No.: US 8,699,505 B2
(45) Date of Patent: Apr. 15, 2014

(54) DYNAMIC CHANNELIZATION CODE ALLOCATION

(75) Inventors: Serge Willenegger, Onnens (CH); Edward G. Tiedemann, Jr., Concord, MA (US); Tao Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1713 days.

(21) Appl. No.: 10/345,528

(22) Filed: Jan. 15, 2003

(65) Prior Publication Data

US 2003/0224798 A1  Dec. 4, 2003

Related U.S. Application Data

(60) Provisional application No. 60/384,990, filed on May 31, 2002.

(51) Int. Cl.
*H04B 7/216* (2006.01)
(52) U.S. Cl.
USPC .................... 370/441; 370/468; 370/534
(58) Field of Classification Search
USPC ......... 370/335, 342–349, 441, 473, 522, 352, 370/468, 534
See application file for complete search history.

(56) References Cited

U.S. PATENT DOCUMENTS

| | | |
|---|---|---|
| 32,905 A | 7/1861 | Baran |
| 4,330,857 A * | 5/1982 | Alvarez et al. ................ 370/321 |
| 4,392,220 A | 7/1983 | Hirosaki et al. |
| RE32,905 E | 4/1989 | Baran |
| 5,299,190 A | 3/1994 | LaMaire et al. |
| 5,442,625 A * | 8/1995 | Gitlin et al. .................... 370/342 |
| 5,504,773 A * | 4/1996 | Padovani et al. ............. 375/130 |
| 5,522,013 A | 5/1996 | Vanska |
| 5,533,013 A | 7/1996 | Leppanen |
| 5,703,902 A | 12/1997 | Ziv et al. |
| 5,751,725 A * | 5/1998 | Chen ............................. 714/708 |
| 5,781,583 A | 7/1998 | Bruckert et al. |
| 5,799,010 A | 8/1998 | Lomp et al. |

(Continued)

FOREIGN PATENT DOCUMENTS

| EP | 1035676 A1 | 9/2000 |
|---|---|---|
| EP | 1035677 | 9/2000 |

(Continued)

OTHER PUBLICATIONS

Internet Protocol, DARPA Internet Protocol Specification, Sep. 1981.*

(Continued)

*Primary Examiner* — Jason Mattis
(74) *Attorney, Agent, or Firm* — Rupit M. Patel

(57) ABSTRACT

Techniques for efficient allocation of channelization codes are disclosed. In one aspect, a dedicated data channel is partitioned into a primary channel and a secondary channel. The rate of the primary channel is a relatively low fixed rate. The rate of the secondary channel varies over time in accordance with the rate of the dedicated channel data. In another aspect, a channelization code indicator is transmitted in the primary channel to identify the secondary channel. In yet another aspect, more than one secondary channel may be deployed. Various other aspects are also presented. These aspects have the benefit of efficient code resource allocation, resulting in increased support for users/and or channels, as well as increased system capacity.

27 Claims, 9 Drawing Sheets

(56) References Cited

U.S. PATENT DOCUMENTS

| | | | |
|---|---|---|---|
| 5,859,840 A * | 1/1999 | Tiedemann et al. | 370/335 |
| 5,946,633 A | 8/1999 | McAlinden | |
| 5,991,279 A * | 11/1999 | Haugli et al. | 370/311 |
| 6,005,851 A * | 12/1999 | Craddock et al. | 370/329 |
| 6,005,855 A | 12/1999 | Zehavi et al. | |
| 6,108,550 A * | 8/2000 | Wiorek et al. | 455/447 |
| 6,173,005 B1 | 1/2001 | Kotzin et al. | |
| 6,201,798 B1 * | 3/2001 | Campanella et al. | 370/326 |
| 6,272,124 B1 | 8/2001 | Ahn et al. | |
| 6,289,228 B1 | 9/2001 | Rotstein et al. | |
| 6,317,413 B1 | 11/2001 | Honkasalo | |
| 6,335,922 B1 * | 1/2002 | Tiedemann et al. | 370/335 |
| 6,377,809 B1 | 4/2002 | Rezaiifar et al. | |
| 6,424,631 B1 | 7/2002 | Czaja et al. | |
| 6,469,993 B1 | 10/2002 | Seo et al. | |
| 6,473,619 B1 | 10/2002 | Kong et al. | |
| 6,477,157 B1 | 11/2002 | Kim et al. | |
| 6,519,260 B1 * | 2/2003 | Galyas et al. | 370/395.42 |
| 6,542,481 B2 * | 4/2003 | Foore et al. | 370/329 |
| 6,552,996 B2 * | 4/2003 | Kim et al. | 370/209 |
| 6,675,016 B2 | 1/2004 | Lucidarme et al. | |
| 6,700,881 B1 | 3/2004 | Kong et al. | |
| 6,707,804 B2 | 3/2004 | Proctor, Jr. | |
| 6,768,728 B1 | 7/2004 | Kim et al. | |
| 6,804,521 B2 | 10/2004 | Tong et al. | |
| 6,834,047 B1 | 12/2004 | Yoon et al. | |
| 6,850,514 B1 * | 2/2005 | Dick et al. | 370/352 |
| 6,870,824 B1 | 3/2005 | Kim et al. | |
| 6,901,062 B2 | 5/2005 | Scherzer et al. | |
| 6,917,581 B2 | 7/2005 | Proctor, Jr. et al. | |
| 6,930,981 B2 | 8/2005 | Gopalakrishnan et al. | |
| 6,963,540 B2 * | 11/2005 | Choi et al. | 370/252 |
| 6,975,666 B2 | 12/2005 | Affes et al. | |
| 6,996,056 B2 | 2/2006 | Chheda et al. | |
| 6,996,069 B2 | 2/2006 | Willenegger | |
| 6,996,075 B2 | 2/2006 | Santhoff et al. | |
| 7,031,741 B2 | 4/2006 | Lee et al. | |
| 7,058,038 B2 | 6/2006 | Yi et al. | |
| 7,130,284 B2 | 10/2006 | Lee et al. | |
| 7,167,460 B2 | 1/2007 | Zehavi et al. | |
| 7,218,617 B1 | 5/2007 | Usuda et al. | |
| 7,254,397 B2 | 8/2007 | Tiedemann, Jr. et al. | |
| 7,319,690 B2 | 1/2008 | Wu et al. | |
| 7,349,375 B2 | 3/2008 | Gerakoulis | |
| 7,352,796 B1 | 4/2008 | Von Der Embse | |
| 7,356,022 B2 | 4/2008 | Takano et al. | |
| 7,430,191 B2 * | 9/2008 | Subrahmanya et al. | 370/335 |
| 7,599,440 B2 | 10/2009 | Won et al. | |
| 7,881,327 B2 | 2/2011 | Tsybakov et al. | |
| 7,933,250 B2 | 4/2011 | Tsybakov et al. | |
| 8,072,942 B2 | 12/2011 | Gaal et al. | |
| 2001/0006515 A1 | 7/2001 | Lee et al. | |
| 2001/0012301 A1 | 8/2001 | Yi et al. | |
| 2001/0021169 A1 | 9/2001 | Kim | |
| 2001/0024482 A1 * | 9/2001 | Tiedemann et al. | 375/354 |
| 2001/0031647 A1 | 10/2001 | Scherzer et al. | |
| 2001/0053140 A1 * | 12/2001 | Choi et al. | 370/335 |
| 2002/0021692 A1 | 2/2002 | Huh et al. | |
| 2002/0067692 A1 | 6/2002 | Yun et al. | |
| 2002/0097697 A1 | 7/2002 | Bae et al. | |
| 2002/0110101 A1 | 8/2002 | Gopalakrishnan et al. | |
| 2002/0122398 A1 * | 9/2002 | Jou | 370/335 |
| 2002/0141367 A1 * | 10/2002 | Hwang et al. | 370/335 |
| 2002/0160781 A1 * | 10/2002 | Bark et al. | 455/450 |
| 2002/0196867 A1 | 12/2002 | Yoon | |
| 2003/0063583 A1 * | 4/2003 | Padovani et al. | 370/329 |
| 2003/0067964 A1 | 4/2003 | Li | |
| 2003/0078010 A1 | 4/2003 | Davis | |
| 2003/0099282 A1 | 5/2003 | Magnusson | |
| 2003/0114162 A1 | 6/2003 | Chheda et al. | |
| 2003/0161286 A1 | 8/2003 | Li | |
| 2005/0050427 A1 | 3/2005 | Jeong et al. | |
| 2005/0084112 A1 | 4/2005 | Kim et al. | |
| 2005/0164663 A1 | 7/2005 | Santhoff et al. | |
| 2005/0250521 A1 | 11/2005 | Joshi et al. | |
| 2006/0120322 A1 | 6/2006 | Lindskog et al. | |
| 2006/0209674 A1 | 9/2006 | Chen et al. | |

FOREIGN PATENT DOCUMENTS

| | | |
|---|---|---|
| EP | 1061680 A1 | 12/2000 |
| JP | 11-502690 | 7/1997 |
| JP | 2001-517049 | 9/1998 |
| JP | 11234170 A | 8/1999 |
| JP | 2000512094 T | 9/2000 |
| JP | 2001016644 A2 | 1/2001 |
| JP | 2001510297 A | 7/2001 |
| WO | 9746044 | 12/1997 |
| WO | WO00/33589 | 6/2000 |
| WO | WO0042723 A1 | 7/2000 |
| WO | 0054443 | 9/2000 |
| WO | 0135550 | 5/2001 |
| WO | 0169952 | 9/2001 |
| WO | 0235735 | 5/2002 |

OTHER PUBLICATIONS

3GPP TS 25.211 V3.7.0 (Jun. 2001) "3rd Generation Partnership Project Technical Specification Group Radio Access network Physical Channels and Mapping of Transport Channels Onto Physical Channels (FDD)" vol. 3.7.0 pp. 1-45.
Baier A: "Open Multi-rate radio interface architecture based on CDMA" Oct. 12, 1993, Universal Personal Communications, 1993. Personal communications: Gateway to the 21st Century. Conference Record., 2nd International Conference on Ottawa, Ont., Canada Oct. 12-15, 1993, New York, NY USA, IEEE, pp. 985, XP010198264 ISBN: 0-7803-1396-8.
International Search Report—PCT/US03/016054, International Searching Authority—European Patent Office, Oct. 9, 2003.
Internationei Preliminary Report on Patentability—PCT/US03/016054—IPEA/US, Feb. 22, 2006.
European Search Report and Search Opinion—EP0700853, Search Authority—The Hague, May 30, 2007.
Fossa C E et al: "A Dynamic Code Assignment Algorithm for Quality of Service in 3G Wirless Networks" Wirless Communications and Networking Conference, 2002, WCNC2002. 2002 IEEE, Piscataway, NJ, USA, IEEE Mar. 17, 2002, vol. 1, pp. 1-6, XP010585724.
International Search Report and Written Opinion—PCT/US04/39686—International Search Authority—European Patent Office—Apr. 6, 2005.
International Search Report—PCT/US04/018993—International Search Authority, European Patent Office—Sep. 11, 2004.
Sunay, M. Oguz, et al., "Provision of Variable Data Rates in Third Generation Wideband DS CDMA Sytems" Wireless Communications and Networking Conference, 1999. WCNC. 1999 IEEE New Orleans, LA, USA, Sep. 21-24, 1999, pp. 505-509, XP010353838.
Written Opinion—PCT/US04/018993—International Search Authority, European Patent Office—May 11, 2004.

* cited by examiner

DYNAMIC CHANNELIZATION CODE ALLOCATION

CLAIM OF PRIORITY UNDER 35 U.S.C. §119

The present Application for Patent claims priority to Provisional Application No. 60/384,990 entitled "Method and Apparatus for Dynamic Code Allocation in a CDMA Communication System" filed May 31, 2002, and assigned to the assignee hereof and hereby expressly incorporated by reference herein.

BACKGROUND

1. Field

The present invention relates generally to communications, and more specifically to a novel and improved method and apparatus for dynamic channelization code allocation in a communication system.

2. Background

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), (4) a data-only communication system such as the high data rate (HDR) system that conforms to the TIA/EIA/IS-856 standard (the IS-856 standard), (5) a system combining features of a system like the IS-2000 standard with features similar to the IS-856 standard, such as detailed in documents entitled "Updated Joint Physical Layer Proposal for 1xEV-DV", submitted to 3GPP2 as document number C50-20010611-009, Jun. 11, 2001; "Results of L3NQS Simulation Study", submitted to 3GPP2 as document number C50-20010820-011, Aug. 20, 2001; "System Simulation Results for the L3NQS Framework Proposal for cdma2000 1xEV-DV", submitted to 3GPP2 as document number C50-20010820-012, Aug. 20, 2001, and related documents generated subsequently (the 1xEV-DV proposal), and (6) other standards.

Communication with multiple mobile stations may be supported using various types of channels in a wireless communication system, such as those listed above. For example, voice communications may be supported using a dedicated channel for each active voice call. Dedicated data channels may also be supported. In this situation, the number of simultaneous users served by a base station within given spectrum is limited by the supportable number of dedicated channels. One or more shared channels may also be deployed. Multiple mobile stations may access a shared channel using one of a variety of multiple access techniques, known in the art. Additional channels may be reserved for various signaling and system support functions. Each of the various systems listed above may provide support for multiple dedicated channels, one or more shared channels, or a combination of both.

In a CDMA system, various channels can be distinguished through the use of channelization codes. Example channelization codes are orthogonal codes such as Walsh codes or Orthogonal Variable Spreading Factor (OVSF) codes. There are a limited number of codes available for a given spreading factor (SF), and thus the number of channels, including dedicated and shared channels, is limited for a given code space. In IS-95 systems, the forward link capacity is limited by interference, and therefore the code space is sufficient for the number of supportable channels. However, advances in more recent systems reduce the effects of interference, allowing for additional simultaneous users, and thus increasing demand for codes to support the additional channels.

Furthermore, channels using higher data rates may be desired. A higher data rate may be transmitted with a smaller spreading factor. Increased use of smaller spreading factors reduces the overall number of codes available.

Increase demand for codes, reduced available codes, or a combination of the two factors may cause the code space to be depleted in a given system configuration. Thus, capacity will be limited in situations where, due to advances in interference mitigation, additional users and/or increased data throughput would otherwise have been available. There is therefore a need in the art for efficient allocation of channelization codes.

SUMMARY

Embodiments disclosed herein address the need for efficient allocation of channelization codes. In one aspect, a dedicated data channel is partitioned into a primary channel and a secondary channel. The rate of the primary channel is a relatively low fixed rate. The rate of the secondary channel varies over time in accordance with the rate of the dedicated channel data. In another aspect, a channelization code indicator is transmitted in the primary channel to identify the secondary channel. In yet another aspect, more than one secondary channel may be deployed. Various other aspects are also presented. These aspects have the benefit of efficient code resource allocation, resulting in increased support for users/and or channels, as well as increased system capacity.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
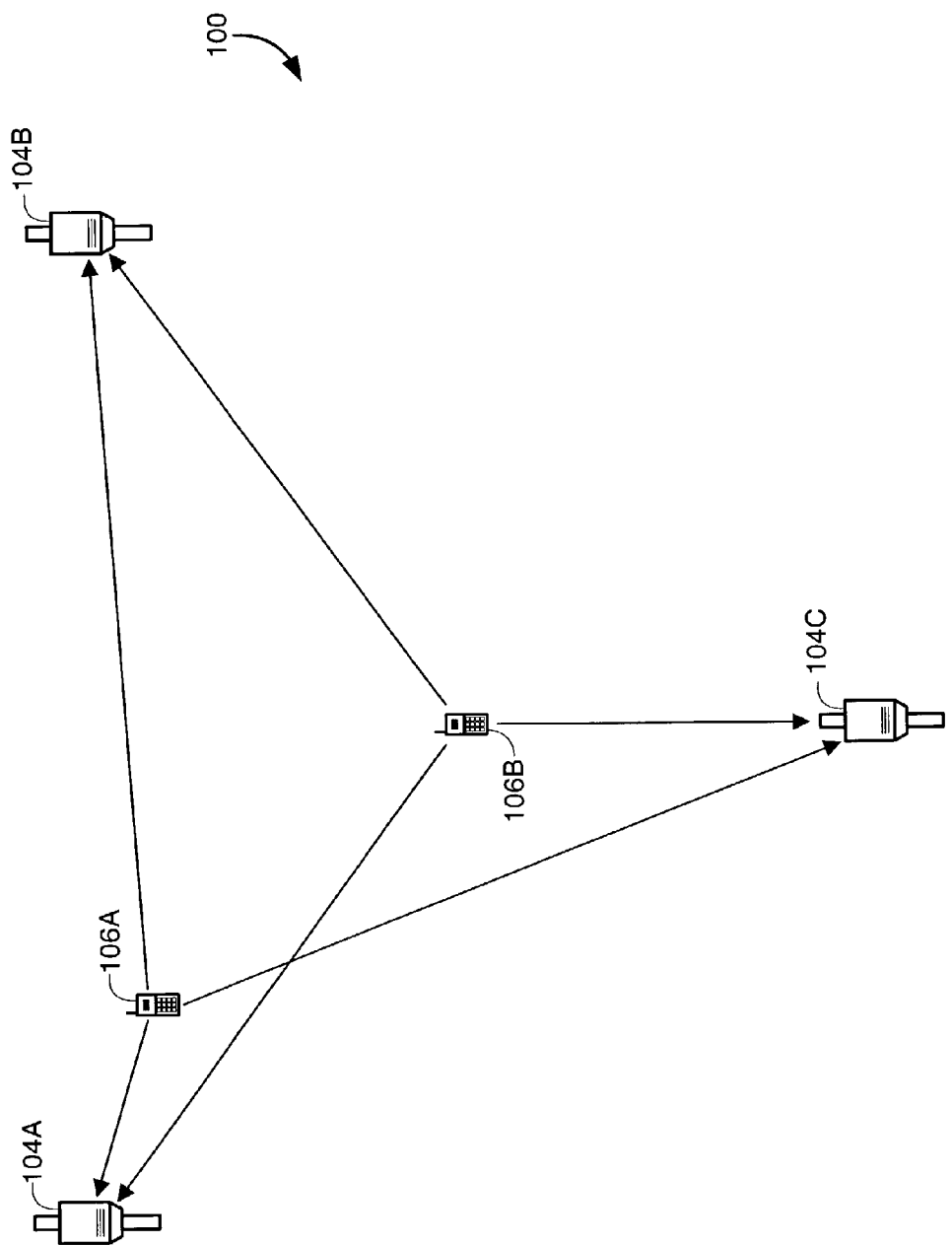
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification, the 1xEV-DV proposal). In an alternative embodiment, system 100 may also deploy any wireless standard or design other than a CDMA system, such as a GSM system.

For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or Node-B. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

As described above, a wireless communication system 100 may support multiple users sharing the communication resource simultaneously, such as an IS-95 system, may allocate the entire communication resource to one user at time, such as an IS-856 system, or may apportion the communication resource to allow both types of access. A 1xEV-DV system is an example of a system that divides the communication resource between both types of access, and dynamically allocates the apportionment according to user demand.

The data rate of a channel corresponds to a symbol rate, where symbols may represent one or more bits of data, depending on the modulation format. A common chip rate is used by all the channels, and so various symbol rates are spread to the common chip rate by applying a corresponding channelization code with a particular spreading factor. In other words, the symbol rate is the chip rate divided by the spreading factor.

Figure 2:
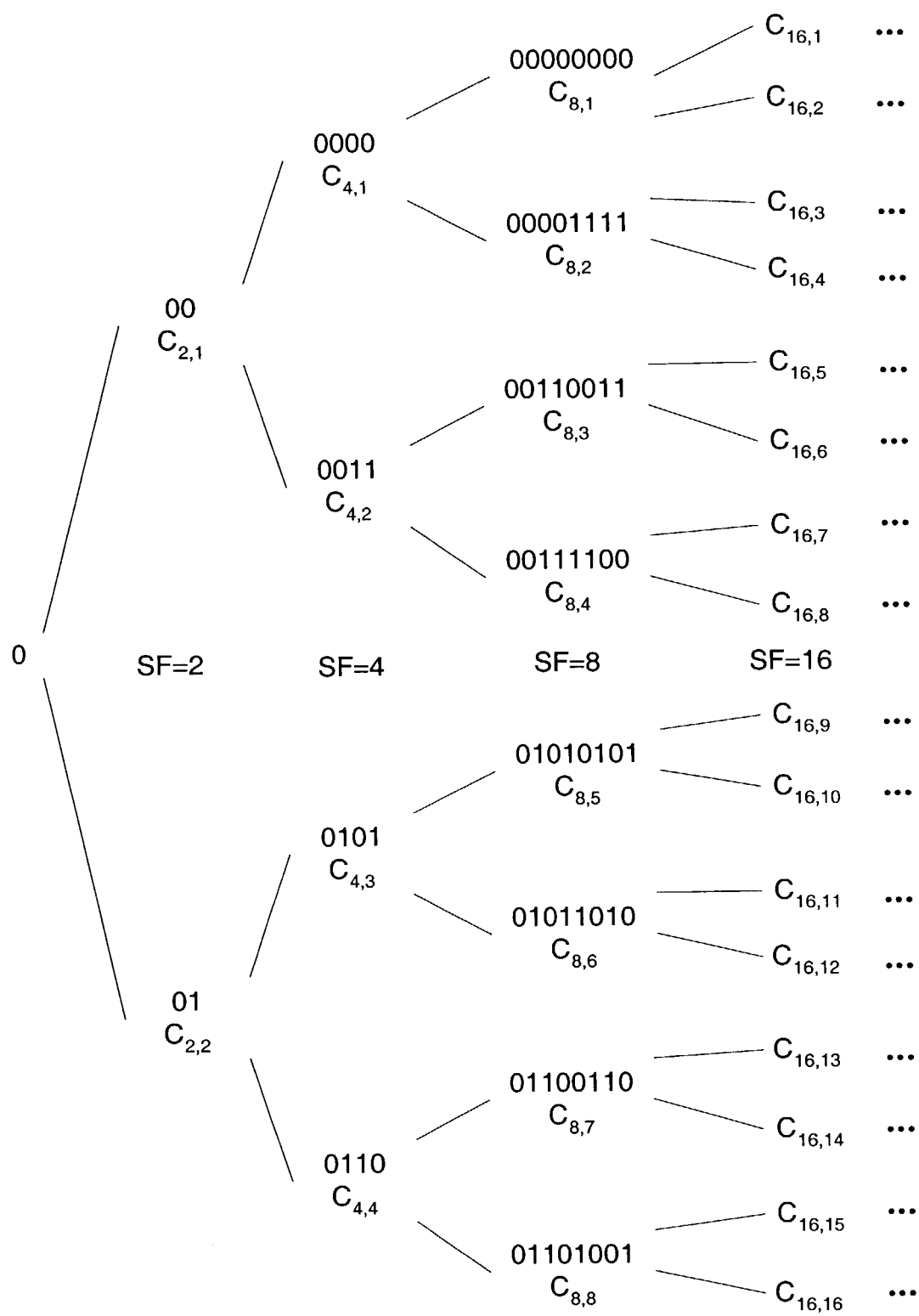
FIG. 2 depicts an example channelization code tree.

FIG. 2 depicts an example channelization code tree. A channelization code, $C_{SF,index}$, is located at a node identified by the spreading factor, SF, and an index identifying one of the codes of a particular spreading factor. Multiple channels with different spreading factors may be transmitted simultaneously, so long as the appropriate codes are selected. Any particular code is orthogonal to all the other codes in the tree, except for those of greater spreading factor branching from the code. Thus, the number of codes available for simultaneous transmission depends on the mix of codes in use at any particular time. For example, four channels of spreading factor 4 can be used together: $C_{4,1}$-$C_{4,4}$. Alternatively, if a code with spreading factor 2 is used, $C_{2,2}$ for example, then only two codes with spreading factor 4 can be used: $C_{4,1}$-$C_{4,2}$. It can be seen that covering with the sequence 01 is not orthogonal to covering with either the sequence 0101 or 0110. If code $C_{2,2}$ is used, any valid combination of codes from the upper half of the tree can be used, but the remainder of the bottom tree would not be orthogonal. So, as another example, $C_{2,2}$ can be used with four spreading factor 8 codes, $C_{8,1}$-$C_{8,4}$. Or, $C_{2,2}$ can be used with one spreading factor 4 code, such as $C_{4,1}$, with two spreading factor 8 codes, $C_{8,3}$-$C_{8,4}$, for example. A tree of any size can be constructed. The tree size is limited if a maximum spreading factor is deployed. A maximum spreading factor, corresponding to the lowest supported data rate, is commonly specified in a communication system.

It can be seen that the choice of codes selected can affect the availability of other codes. For example, if four SF 8 codes are desired, selecting all four from the upper half of the tree leaves the lower half of the tree available (i.e., selecting $C_{8,1}$-$C_{8,4}$). Thus, an additional SF 2 code can be used, or two SF 4 codes, and so forth. By contrast, if $C_{8,1}$, $C_{8,3}$, $C_{8,5}$ and $C_{8,7}$ are selected as the four SF 8 codes, then no additional SF 4 or SF 2 codes can be simultaneously used. Techniques for selecting codes so as to reduce code tree fragmentation are known in the art.

In the prior art, dedicated channels may be assigned a fixed spreading factor. When the data rate is constant for the channel, the spreading factor is selected to accommodate that rate. When the channel is a variable rate channel, such as a variable rate voice or video channel, the fixed spreading factor is set to accommodate the highest transfer rate of the channel. In other words, the spreading factor required is computed as the chip rate divided by the maximum symbol rate. Thus, a channel assigned a spreading factor code in accordance with its maximum rate will underutilize the code resource during the time periods when rates less than the maximum are used.

Note that the W-CDMA specification supports data transmission on multiple channels, i.e., the Dedicated Physical Channel (DPCH) and the Physical Downlink Shared Channel (PDSCH). The cdma2000 specification supports similar channels, the Fundamental Channel (FCH) and the Supplemental Channel (SCH). These channels are assigned static channels. The PDSCH may be assigned a set of codes, but the set is static. It can only be updated using network signaling. The SCH is fixed, with a single code. Therefore, use of these channels as specified may also underutilize the code resource, as described above.

As described above, in some earlier systems, the code resource was not fully used, and thus assigning a fixed spreading factor associated with a maximum rate was not an issue. For example, the capacity of the system was interference limited, and the code tree was never exhausted. However, developments such as fast power control, transmission diversity, etc., have made forward link transmission more efficient, and thus increased communication channels can be supported, requiring additional code resources.

As described with respect to FIG. 2, using higher data rates also limits the availability of additional channels in the code resource. A number of factors may lead to demand for increased rates, thus limiting the supply of available codes in the resource.

One factor is that signaling may cause the data rate to increase. In IS-95 or IS-2000 systems, for example, the maximum data rate for the voice channel is fixed. Signaling data is inserted into the data stream where available. Dim-and-burst or blank-and-burst signaling, techniques well known in the art, can be used without increasing the rate required. Alternate systems, W-CDMA, for example, use out of band signaling such that the signaling information is appended to the voice traffic frame. This increases the number of bits to transmit in the frame, and thus a higher rate, or lower spreading factor is required.

Another factor leading to increased data rates can be illustrated with voice channels as an example. Well known in the art are vocoding techniques for encoding voice into a variable rate data stream. To increase capacity as limited by other-user interference, it is desirable to transmit the voice signal with the least amount of data required to sustain acceptable voice quality. An example vocoder is an Enhanced Variable Rate Codec (EVRC) vocoder. An example EVRC system transmits voice data using eighth, quarter, half, and full rate frames. When a user is silent, while listening, for example, eighth rate frames are transmitted. The power required to send eighth rate frames, and thus the interference introduced into the system, is lower than when higher rate frames are transmitted. When the user is speaking, a variety of the higher rate frames are transmitted. In practice, it turns out that, on average, eighth rate and full rate frames are used predominantly, and quarter and half rate frames are less likely. The average data rate for the voice channel is much less than if full rate frames were used exclusively. In a typical scenario, the average rate may less than half of the maximum rate, and so a capacity improvement is seen due to reduced interference. Note, however, that, with a fixed spreading factor, code space limited capacity is the same whether or not the average rate is less than full rate.

An alternate vocoder has been developed, Selectable Mode Vocoder (SMV), which makes more effective use of the medium rates (i.e. quarter and half rates), thus reducing the frequency of full rate frames. The result is that the average rate of an SMV vocoder may be less than the average rate of an EVRC vocoder. From an interference standpoint, the capacity can then be improved. Again, however, from a code space standpoint, with a fixed spreading factor code assigned to each dedicated voice channel, no improvement is seen with this vocoder either.

Yet another vocoder has been developed, Wideband Adaptive MultiRate (WB-AMR), which uses an 8 KHz sampling rate instead of the 4 KHz sampling rate used by EVRC and SMV. The result is a very high fidelity voice reproduction, with only a modest increase in average data rate. However, the maximum rate is substantially higher than for EVRC or SMV, and therefore worse for capacity in a code space limited system.

The support for additional channels due to interference reduction means the code space limitation is more likely to be reached. Furthermore, the higher rate channels use more of the code resource. Thus, the trend is that code space is becoming limited.

Figure 3:
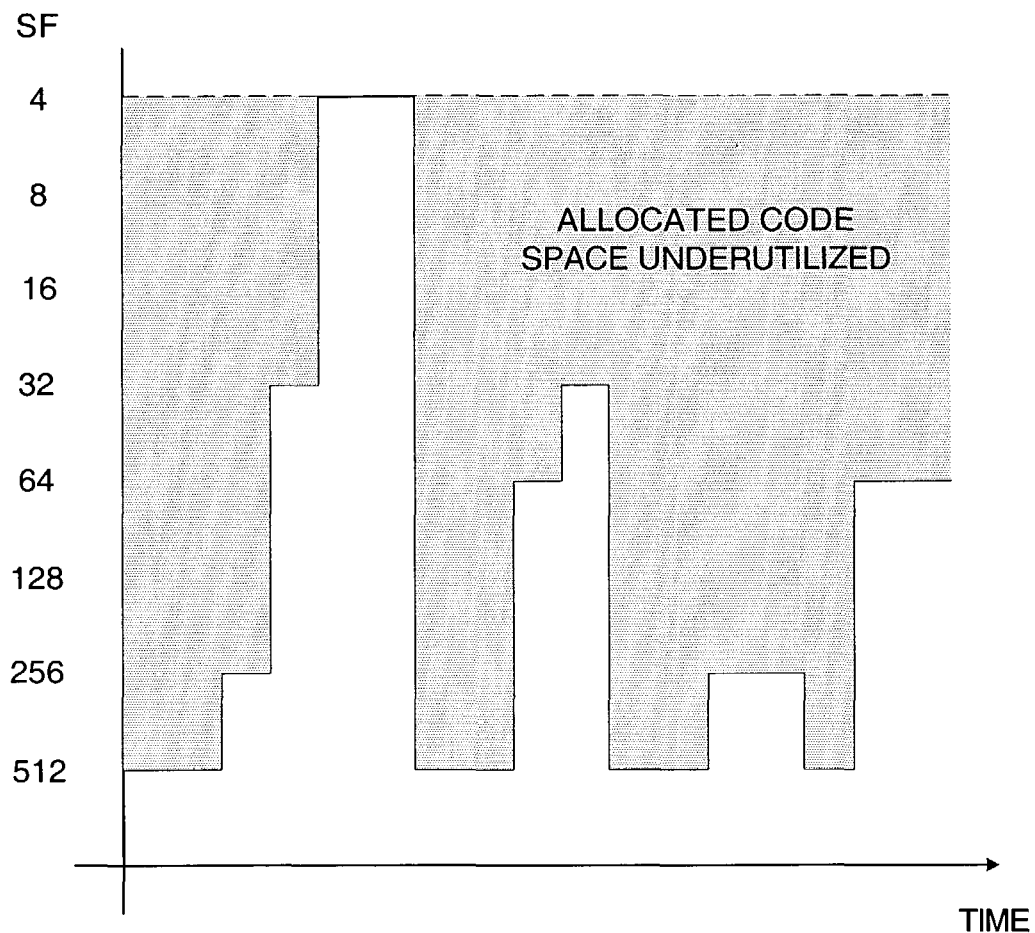
FIG. 3 is a graphical representation of underutilized code space for an example variable rate signal.

FIG. 3 is graph of the spreading factor use of an example dedicated channel. In this example, the minimum data rate corresponds to a spreading factor of 512, and the maximum rate corresponds to a spreading factor of 4. In a system in which the channelization code is fixed, the maximum data rate will dictate the minimum spreading factor, in this case, 4. As shown in this example, the minimum spreading factor is used relatively little. The underutilization of the code space is indicated by the shaded portion of the graph. Embodiments described below illustrate techniques for reclaiming the underutilization of code space, thus increasing the effective usable code space, and increasing capacity in systems that would otherwise be capacity constrained due to limited code space.

Figure 4:
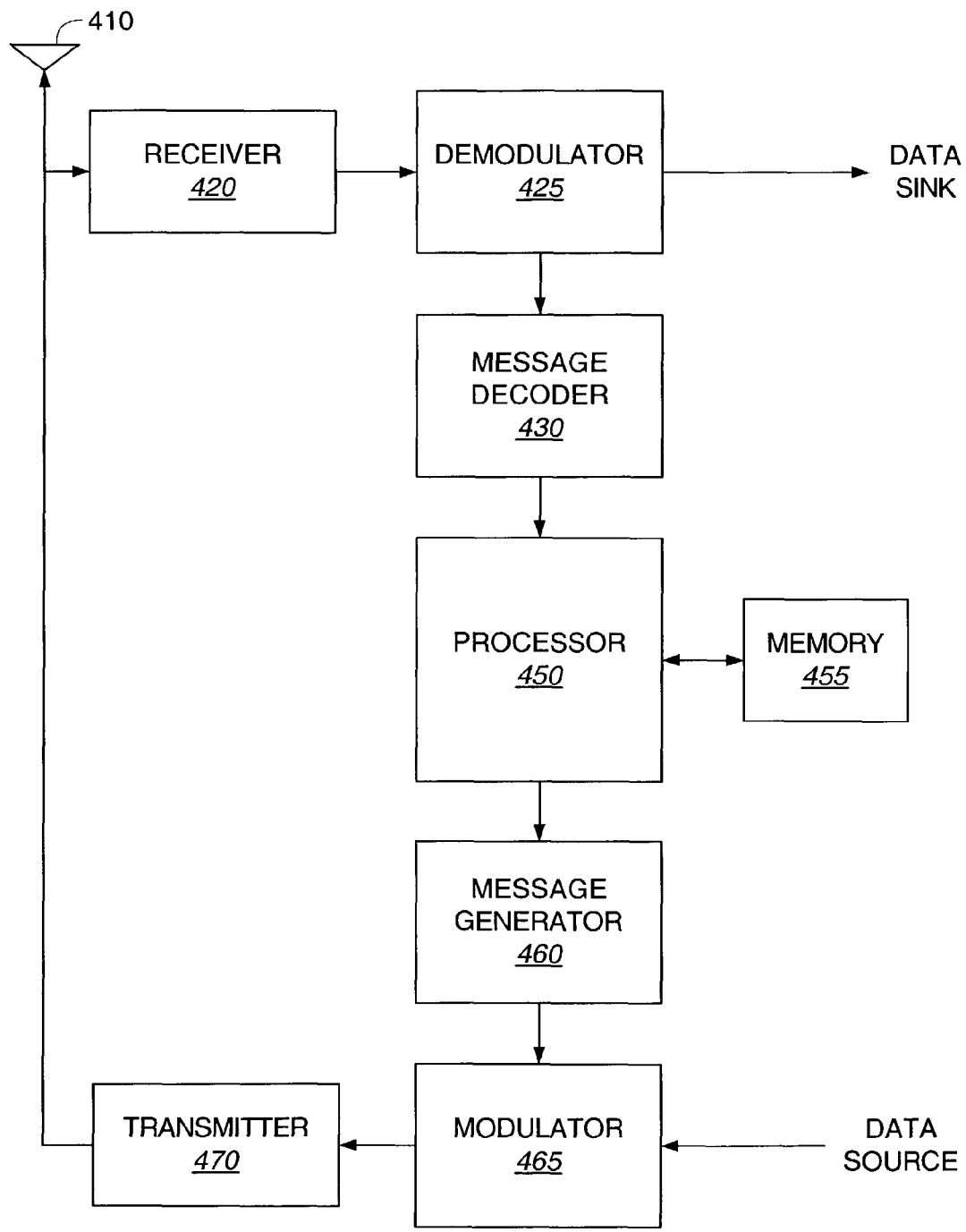
FIG. 4 is a block diagram of a wireless communication device, such as a mobile station or base station.

FIG. 4 is a block diagram of a wireless communication device, such as mobile station 106 or base station 104. The blocks depicted in this example embodiment will generally be a subset of the components included in either a base station 104 or mobile station 106. Those of skill in the art will readily adapt the embodiment shown in FIG. 4 for use in any number of base station or mobile station configurations.

Signals are received at antenna 410 and delivered to receiver 420. Receiver 420 performs processing according to one or more wireless system standards, such as the standards listed above. Receiver 420 performs various processing such as Radio Frequency (RF) to baseband conversion, amplification, analog to digital conversion, filtering, and the like. Various techniques for receiving are known in the art.

Signals from receiver 420 are demodulated in demodulator 425 according to one or more communication standards. In an example embodiment, a demodulator capable of demodulating W-CDMA signals is deployed. In alternate embodiments, alternate standards may be supported, and embodiments may support multiple communication formats. Demodulator 425 may perform RAKE receiving, equalization, combining, deinterleaving, decoding, or various other functions as required by the format of the received signals. Various demodulation techniques are known in the art. In a base station 104, demodulator 425 will demodulate according to the reverse link. In a mobile station 106, demodulator 425 will demodulate according to the forward link. Both data and control channels described herein are examples of channels that can be received and demodulated in receiver 420 and demodulator 425. Demodulated data may be delivered to a data sink, such as a communication application running on processor 450, or an externally connected device. Demodulated data may be delivered for further processing in a vocoder to reproduce speech signals, for example.

Message decoder 430 receives demodulated data and extracts signals or messages directed to the mobile station 106 or base station 104 on the forward or reverse links, respectively. Message decoder 430 decodes various messages used in setting up, maintaining and tearing down a call (including voice or data sessions) on a system. Messages may include channel quality indications, such as C/I measurements, ACK/NAK messages, or control channel messages used for demodulating the forward data channel. Messages may include channelization code information, examples of which are detailed below. Various other message types are known in the art and may be specified in the various communication standards being supported. The messages are delivered to processor 450 for use in subsequent processing. Some or all of the functions of message decoder 430 may be carried out in processor 450, although a discrete block is shown for clarity of discussion. Alternatively, demodulator 425 may decode certain information and send it directly to processor 450 (a single bit message such as an ACK/NAK or a power control up/down command are examples).

Signals are transmitted via antenna 410. Transmitted signals are formatted in transmitter 470 according to one or more wireless system standards, such as those listed above.

Examples of components that may be included in transmitter 470 are amplifiers, filters, digital-to-analog (D/A) converters, radio frequency (RF) converters, and the like. Data for transmission is provided to transmitter 470 by modulator 465. Data and control channels can be formatted for transmission in accordance with a variety of formats. Data for transmission on the forward link data channel may be formatted in modulator 465 according to a rate and modulation format indicated by a scheduling algorithm. Similarly, transmitter 470 may be directed to transmit at a power level in accordance with the scheduling algorithm. Various types of channels may be generated and transmitted in conjunction with message generator 460, modulator 465, and transmitter 470, and may incorporate data from one or data sources of various types, as indicated in FIG. 4 as the data source. Examples of components that may be incorporated in modulator 465 include encoders, interleavers, spreaders, and modulators of various types.

Message generator 460 may be used to prepare messages of various types, as described herein. For example, various data frames, described further below, may include channelization code information, as well as other message data. Various types of control messages may be generated in either a base station 104 or mobile station 106 for transmission on the forward or reverse links, respectively.

Data received and demodulated in demodulator 425 may be delivered to processor 450 for use in voice or data communications, as well as to various other components. Similarly, data for transmission may be directed to modulator 465 and transmitter 470 from processor 450. For example, various data applications may be present on processor 450, or on another processor included in the wireless communication device 104 or 106 (not shown). A base station 104 may be connected, via other equipment not shown, to one or more external networks, such as the Internet (not shown). A mobile station 106 may include a link to an external device, such as a laptop computer (not shown).

Processor 450 may be a general-purpose microprocessor, a digital signal processor (DSP), or a special-purpose processor. Processor 450 may perform some or all of the functions of receiver 420, demodulator 425, message decoder 430, message generator 460, modulator 465, or transmitter 470, as well as any other processing required by the wireless communication device. Processor 450 may be connected with special-purpose hardware to assist in these tasks (details not shown). Data or voice applications may be external, such as an externally connected laptop computer or connection to a network, may run on an additional processor within wireless communication device 104 or 106 (not shown), or may run on processor 450 itself. Processor 450 is connected with memory 455, which may be used for storing data as well as instructions for performing the various procedures and methods described herein. Those of skill in the art will recognize that memory 455 may be comprised of one or more memory components of various types, that may be embedded in whole or in part within processor 450.

Figure 5:
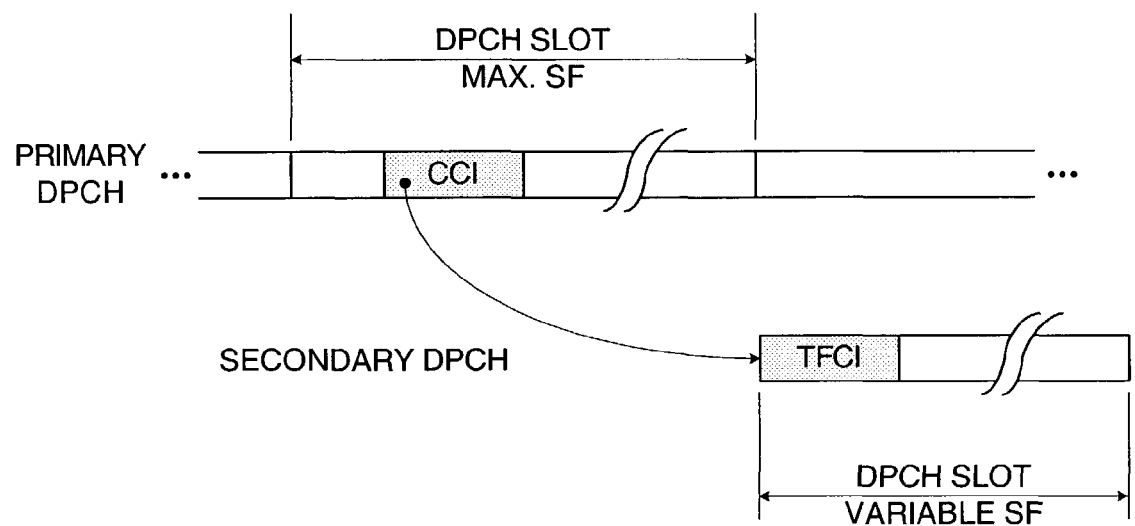
FIG. 5 depicts example primary and secondary dedicated physical channel frames.

To alleviate the underutilization of code resources, as described above, channelization codes may be dynamically allocated for use in communication with various mobile stations. An example channel that can be deployed using this technique is the dedicated physical channel (DPCH). The W-CDMA specification details such a channel, and similar dedicated channels are described in other standards such as IS-95 and IS-2000. The example structure comprises a primary DPCH (P-DPCH) and one or more secondary DPCHs (S-DPCH). FIG. 5 depicts example primary and secondary dedicated physical channel frames. The examples detailed below may include only a subset of the various information fields and/or signals deployed in any given embodiment. Those of skill in the art will readily adapt the principles taught herein to systems such as those listed above, as well as new systems as they are conceived.

The primary DPCH is constantly allocated to a mobile station during a call. It is spread with the largest supported spreading factor, and is therefore transmitted at the lowest supported rate. The primary DPCH is allocated a channelization code accordingly. Although the code is allocated throughout the duration of the call, since it is as far down the code tree as possible, its allocation does not prevent any other codes from being allocated for other purposes. In an example W-CDMA system, the maximum spreading factor is 512, although any maximum spreading factor may be deployed. In an alternate embodiment, the P-DPCH may be allocated a spreading factor smaller than the maximum. In such an embodiment, the code space allocation may not be optimum, but the advantages of the present invention can still be attained. This alternative is not detailed further in the following discussion. Those of skill in the art will readily adapt the embodiments described herein to this situation.

The DPCH may be used to transmit a variable rate signal. One example is a vocoded voice channel, as described above. When a frame of the variable rate signal is the lowest supported rate, the P-DPCH may be sufficient to carry the entire frame. When the frame rate is higher than the lowest supported rate, a portion of the frame may be transmitted on the P-DPCH, and the remainder may be transmitted on one or more S-DPCHs. A channelization code indicator (CCI) may be transmitted on the P-DPCH that identifies a S-PDCH when one is used, or indicates that no secondary channel is necessary. These features are detailed further below.

FIG. 5 shows a frame on the primary DPCH filling a DPCH slot and transmitted using the maximum spreading factor, i.e. the lowest rate. A shaded CCI field is shown which indicates the channelization code for the secondary DPCH that will be transmitted during the next slot. Delaying the S-DPCH by one slot eliminates the need to buffer data while the CCI is decoded. In an alternate embodiment the S-DPCH may be transmitted in the concurrent slot (details not shown). The CCI may be located anywhere within the slot. In an example W-CDMA deployment, the P-DPCH may transmit other information such as a power control bit or one or more pilot bits.

Various data formats may be used for transmission on a DPCH. For example, in a W-CDMA system, various transport format combinations (TFCs) may be supported. A transport format combination indicator (TFCI) may be used to identify the transmission format. The term TFCI is used herein to denote any transmission format indicator, the W-CDMA TFCI is used as an example only. In an example embodiment, a TFCI is not transmitted on the P-DPCH when a CCI indicator is used to identify a secondary channel. In this fashion, the CCI can use the bits that would otherwise be allocated to the TFCI. The mobile station can use blind detection to determine the format of the P-DPCH, a technique well known in the art. Another alternative is to include a bit to indicate whether the subsequent bits include a channelization code for the secondary channel, or include a TFCI for the primary channel. Various combinations of channelization code or transport format information can be contemplated all of which fall within the scope of the present invention.

The secondary DPCH frame may include a TFCI for the frame, as shown in FIG. 5. Alternatively, blind format detection could be employed for the secondary channel as well. Knowledge of the spreading factor for the secondary channel, as indicated in the CCI, may reduce the number of hypotheses required for blind format detection.

Any number of secondary channels can be deployed. For example, a second CCI could be included in one secondary channel to identify the location of another secondary channel, in the same manner as the primary channel identifies the secondary. Any number of secondary channels may be serially identified. Or, any one of the CCIs described herein could include multiple channelization codes to identify multiple secondary channels. Myriad such combinations will be readily identified by those of skill in the art in light of the teaching herein.

It can be seen that variable rate data can be transmitted on a dedicated channel using a primary channel and one or more secondary channels, examples of which are shown in FIG. 5. The primary channel is allocated a fixed code, thus the channel is dedicated to the mobile station. The secondary channel can be dynamically allocated using different spreading factors during subsequent frames. As such, the allocation of the code resource can be made to support the rates actually being used, rather than to compensate for the maximum rate of the variable rate data. Therefore, the underutilization of the code resource, an example of which is depicted in FIG. 3, can be mitigated.

Figure 6:
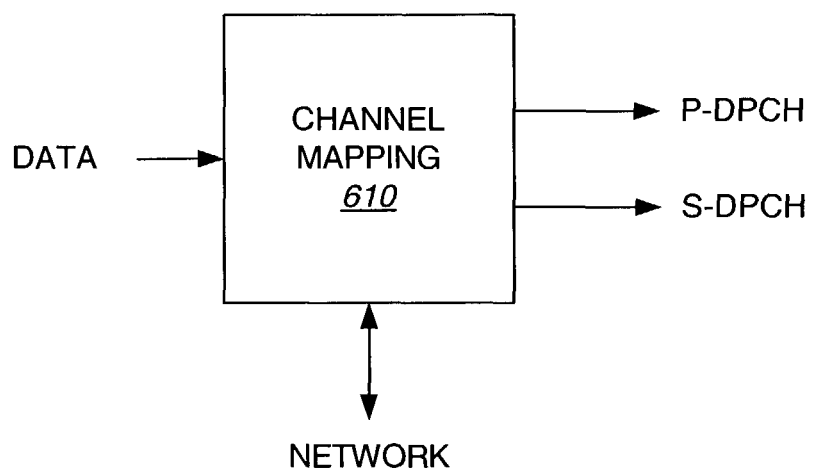
FIG. 6 depicts an example channel mapping block for generating primary and secondary channels.

FIG. 6 shows an example embodiment for generating primary and secondary channels, such as those depicted in FIG. 5. Channel mapping block 610 receives variable rate data from a data source (i.e. a variable rate vocoder). Each frame of the received data is segmented into two data channels, primary and secondary. The amount of data apportioned to the primary channel is determined according to the fixed data rate supported on that channel. In an example embodiment, the fixed data rate is the lowest supported rate. The remainder of the data is apportioned to the secondary channel. Note that, in alternate embodiments, more than one secondary channel may be deployed. The rate of the secondary channel may vary depending on the rate of the variable rate data frame being mapped. In the example embodiment, the rate of the data can vary frame by frame.

The rate required for the secondary channel, or, equivalently, a required spreading factor, is determined. Channel mapping block 610 is shown connected to an external network. An available code at the required rate (or with the required spreading factor) is delivered to the channel mapping block 610 in response to the required rate for the current frame of data being prepared for transmission on the secondary channel. The allocated code may be included in the CCI and transmitted on the primary DPCH, as described above with respect to FIG. 5. In an example embodiment, a base station 104, such as one depicted in FIG. 4, may deploy the functionality of channel mapping block 610 across various of its components. For example, processor 450 may be used to run the channel mapping process, with the primary and secondary channels generated by modulator 465 and transmitter 470 in conjunction with the desired channelization codes. Message generator 460 may be used to prepare messages including the CCI. Those of skill in the art will readily adapt the principles disclosed herein to myriad wireless communication devices currently known in the art as well as those yet to be developed.

Any technique for code allocation may be deployed within the scope of the present invention. In an example system, each base station may support multiple dedicated physical channels with multiple mobile stations. In an example W-CDMA embodiment, the network allocates the available channelization code resource to the various mobile stations, based on the instantaneous traffic of each mobile station, using the Node-B Medium Access Control (MAC) entity. If the network is synchronized, then the code resource can be efficiently allocated to each mobile station simultaneously. Asynchronous networks may also be supported, although a more complex scheduling algorithm may be needed, and the code resource utilization may not be as efficient as with a synchronous network.

Figure 9:
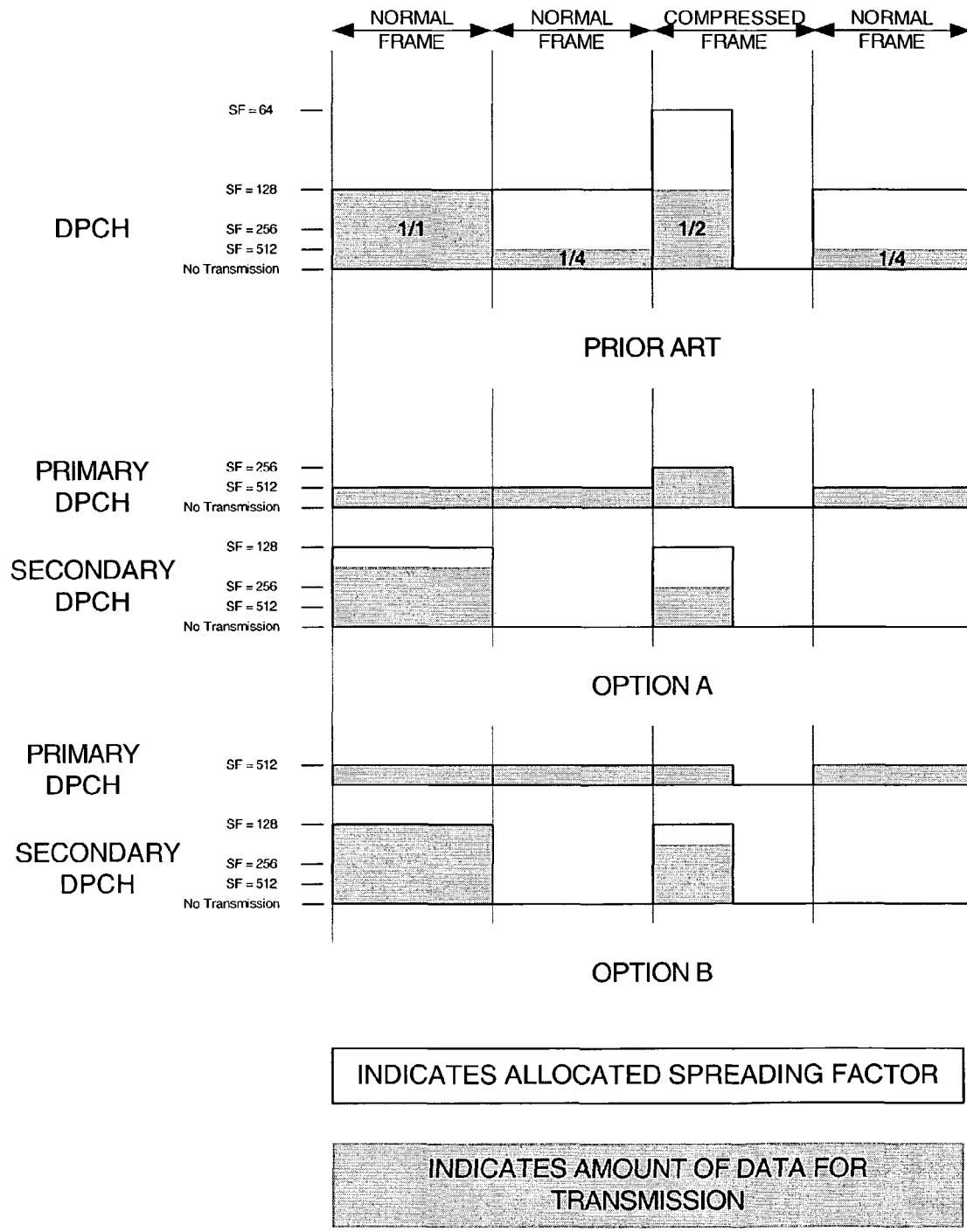
FIG. 9 depicts example channels illustrating compressed mode.

While various embodiments described herein have assumed a fixed spreading factor for the primary DPCH, it should be noted that, according to certain procedures defined for the DPCH operation, the spreading factor for the primary DPCH may be changed occasionally. An example of such a procedure is the compressed mode operation defined in the W-CDMA specification that allows the network to temporarily halve the spreading factor of the DPCH in order to create some gap in the frame transmission while maintaining the same symbol rate. An example of such a scenario is shown in FIG. 9, labeled PRIOR ART.

Such a procedure would not interfere with the embodiments described herein. The corresponding example is depicted in FIG. 9, labeled OPTION A. However, the compressed mode procedure may be improved using techniques disclosed herein as follows. Instead of halving the spreading factor for the primary DPCH, the system could maintain the same spreading factor for the primary DPCH and adjust the secondary DPCH spreading factor such that all the data can be mapped on the primary DPCH and secondary DPCH, taking into account the transmission gaps An example of such a scenario is shown in FIG. 9, labeled OPTION B.

Another consideration is soft handoff. A mobile station in soft handoff may be receiving the DPCH from more than one base station. In the example embodiment, the channelization code allocation is not coordinated, and therefore the channelization codes assigned for either the P-DPCH or S-DPCH may, in general, be different. Accordingly, the CCI received from each base station may be different. In this situation, the CCI bits may not be combinable, and so an increased power offset may be introduced to the CCI during soft handoff to provide adequate power for reliable transmission of the CCI. This effect is similar to the effect of other fields in the transmitted frame, such as power control bits. Alternatively, the channelization code resource may be coordinated between base stations.

Figure 7:
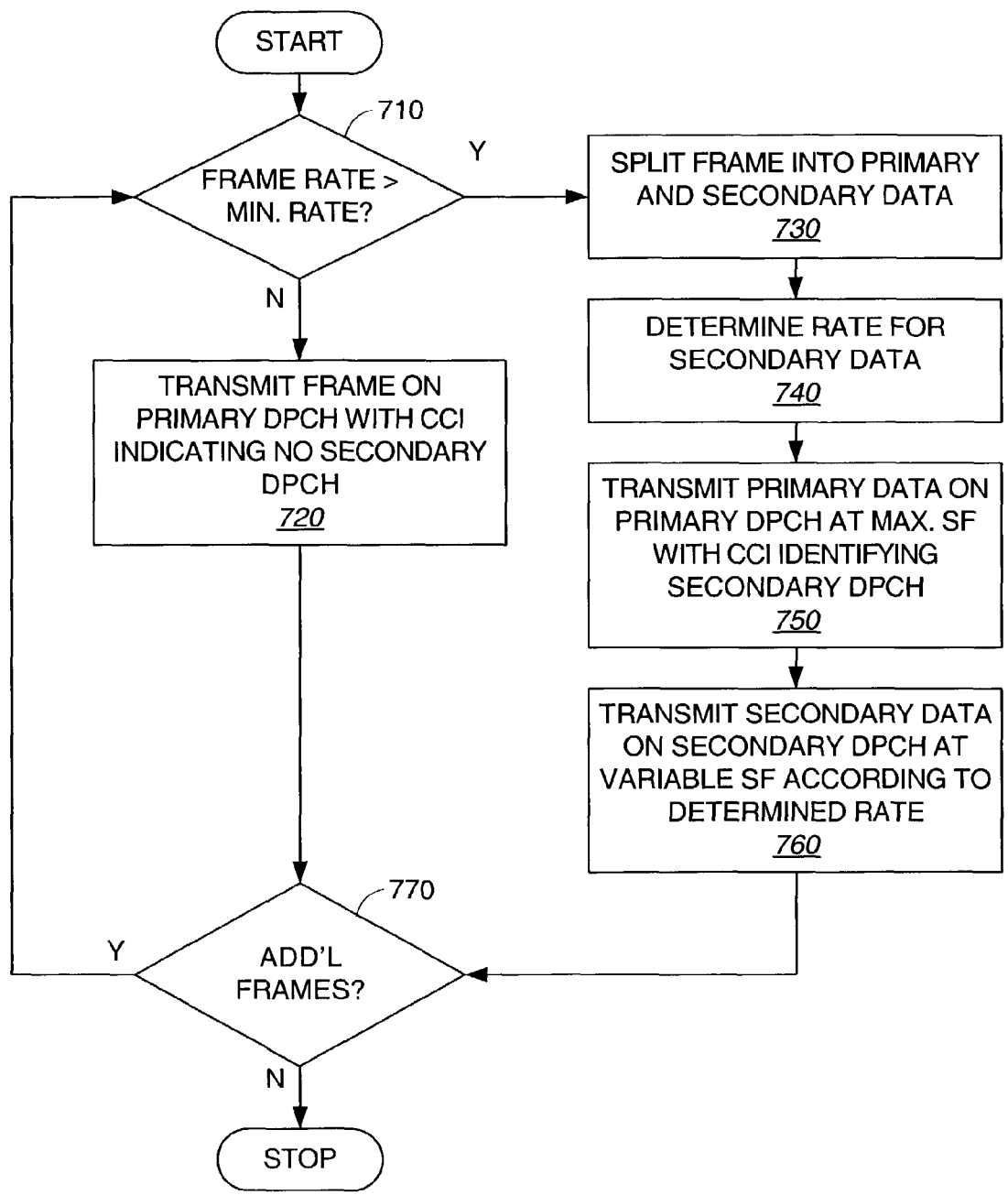
FIG. 7 depicts a flowchart of an example embodiment of a method of transmitting a variable rate signal with dynamic channelization code allocation.

FIG. 7 depicts a flowchart of an example embodiment of a method of transmitting a variable rate signal with dynamic channelization code allocation. The process starts at decision block 710. If the rate of the current frame for transmission is greater then the minimum supported rate, or, in other words, the frame data is larger than would fit in one minimum rate frame, including header and other information, proceed to step 730. If the frame can be transmitted at the minimum rate (or largest spreading factor), proceed to step 720.

In step 720, transmit the frame on the primary DPCH with a CCI indicating no secondary DPCH is necessary. Various alternatives for formatting such a frame are detailed above with respect to FIG. 5. Proceed to decision block 770. In decision block 770, if there are one or more additional frames awaiting transmission, return to decision block 710 to repeat the process for the next frame. If there are no additional frames awaiting transmission, the process can stop.

Steps 730-760 are example steps for transmitting variable rate data on two channels. Various alternate embodiments will be apparent to those of skill in the art in light of the teaching herein. In step 730, the frame is split into primary and secondary data. The amount of primary data will be determined according to the amount of data that can be transmitted in a frame on the primary DPCH at the minimum supported rate.

The remainder of the data can be apportioned as secondary data. In alternate embodiments, more than one secondary channel may be deployed, and therefore the remainder of data will be apportioned into multiple segments of secondary data, accordingly. Proceed to step 740.

In step 740, the rate required for transmission of the secondary data is determined. If more than one secondary channel will be deployed, a rate for each channel may be determined, and each channel need not have the same rate. The rate of a secondary channel may be equal to or greater than the rate of the primary channel. In an alternate embodiment, in which the primary channel is transmitted at a rate higher than the minimum supported rate, the secondary channels may be at a lower rate than the primary channel. A code is selected with a spreading factor appropriate for the desired rate. The code may be selected from the available code resource, which is shared with other users in the system, as described above with respect to FIG. 6. The code or codes for one or more secondary channels may be selected according to the available codes. For example, if a single higher rate code, required to transmit the secondary data on a single secondary channel, is not available, the secondary data may be transmitted on more than one secondary channels, using more than one lower rate codes that may be available. Proceed to step 750.

In step 750, transmit the primary data on the primary DPCH using the dedicated fixed code assigned to the primary DPCH. In the example embodiment, the maximum spreading factor, i.e. lowest rate, is used for the primary DPCH. In addition, transmit a CCI identifying the secondary DPCH. Alternatives include transmitting multiple CCIs in the case of multiple secondary channels. Proceed to step 760.

In step 760, transmit the secondary data on a secondary DPCH (or more than one secondary DPCH) at a spreading factor according to the determined rate. In the example embodiment, the CCI indicates the channelization code of the secondary DPCH, thus identifying a spreading factor and an index, as shown in FIG. 2. Note that the secondary data transmission may vary in rate from frame to frame, and may not be sent at all during a frame when the primary channel is sufficient to transmit the frame. In the example embodiment, transmission of the secondary data is delayed by one frame from the transmission of the primary data, so that buffering is not required while the CCI is received and decoded. Proceed to decision block 770, to determine if additional frames await transmission. If so, return to decision block 710 to process the next frame, as just described. If not, the process may terminate.

Figure 8:
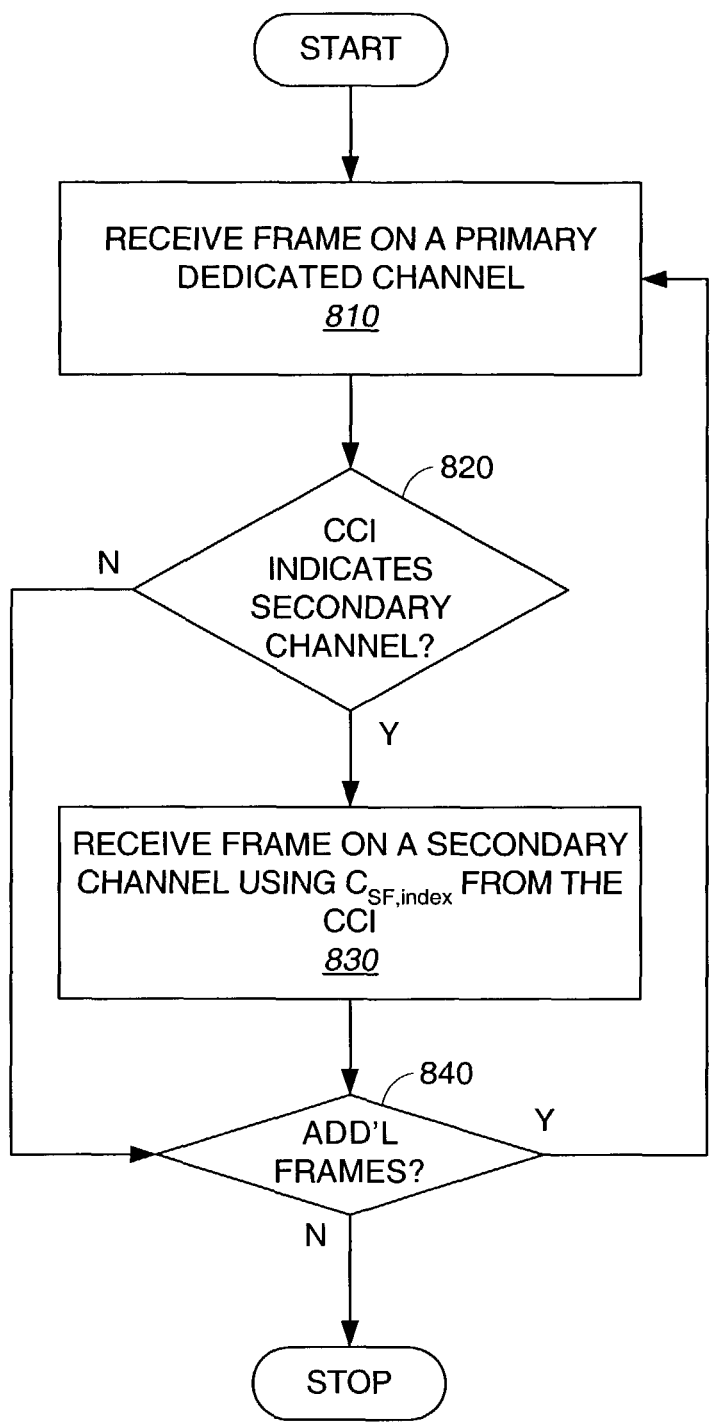
FIG. 8 depicts a flowchart of an example embodiment of a method of receiving a variable rate signal with dynamic channelization code allocation.

FIG. 8 depicts a flowchart of an example embodiment of a method of receiving a variable rate signal with dynamic channelization code allocation. The process begins in step 810. A frame of data is received on the dedicated primary DPCH. The primary DPCH may be received using a receiver 420 and demodulator 425, as described above with respect to FIG. 4, using the P-DPCH channelization code assigned. The transmitted CCI may also be received and decoded. Proceed to decision block 820.

In decision block 820, if the CCI, or alternate signal, as described above with respect to FIG. 5, indicates a secondary channel will be transmitted, proceed to step 830. If not, the full frame has been received on the P-DPCH. Proceed to decision block 840 to determine if additional frames await reception. If so, return to step 810 to process the next frame as just described. If not, the process may stop.

If a secondary channel will be used for the frame, in step 830, receive the secondary channel using the channelization code, $C_{SF,index}$, identified in the CCI. The secondary frame may be delayed from the transmission of the primary frame, as described above. The received primary and secondary frame data may be combined to form the variable rate frame. Proceed to decision block 840, to process additional frames, if any. Otherwise, the process may stop.

It should be noted that in all the embodiments described above, method steps may be interchanged without departing from the scope of the invention. The descriptions disclosed herein have in many cases referred to signals, parameters, and procedures associated with the W-CDMA standard, but the scope of the present invention is not limited as such. Those of skill in the art will readily apply the principles herein to various other communication systems. These and other modifications will be apparent to those of ordinary skill in the art.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
    a channel mapper for:
        receiving a variable rate data frame;
        apportioning the variable rate data frame into a primary data block and one or more secondary data blocks, the primary data block sized for transmission at a fixed, minimum supported data rate, the one or more secondary data blocks comprising the remainder of the variable rate data frame;
        determining one or more secondary rates in accordance with the one or more secondary data blocks;
        forming a primary data frame comprising the primary data block and an indicator identifying a dynamic channelization code associated with at least one of the secondary rates, wherein the dynamic channelization code shares code space with a fixed channelization code associated with the fixed, minimum supported data rate of the primary data block and the dynamic channelization code being dynamically allocated based on a required spreading factor for the variable rate data frame; and
        forming one or more secondary data frames delayed with respect to the primary data frame and comprising the one or more secondary blocks, respectively.

2. The apparatus of claim 1, further comprising a transmitter for:
    transmitting the primary data frame on a primary channel with the fixed channelization code associated with the fixed, minimum supported data rate; and
    transmitting the one or more secondary data frames on one or more secondary channels with codes associated with the one or more secondary rates, respectively.

3. An apparatus, comprising:
    a receiver for receiving over a first fixed data rate data channel a primary data frame comprising a primary data block at a fixed, minimum supported data rate and an indicator and for receiving over a second variable rate channel a secondary data block of a secondary rate delayed with respect to the primary data block and according to the indicator identifying a dynamic channelization code associated with the secondary rate, the primary data block and the secondary data block forming at least a portion of a variable rate data frame, wherein the dynamic channelization code shares code space with a fixed channelization code associated with the fixed, minimum supported data rate of the first fixed data rate data channel and the dynamic channelization code being dynamically allocated based on a required spreading factor for the variable rate data frame.

4. The apparatus of claim 3, wherein the receiver further combines a frame of data from the first fixed data rate data channel with a frame of data from the second variable rate channel to form the variable rate data frame.

5. An apparatus, comprising:
    a control processor for partitioning a source variable rate data stream into a fixed data rate data stream and a variable rate data stream, each frame of the fixed data rate data stream comprising a first portion of a frame of the source variable rate data stream and an indicator identifying a dynamic channelization code associated with a corresponding second portion of the frame, the first portion of the frame delayed with respect to the second portion, wherein the dynamic channelization code shares code space with a fixed channelization code associated with a fixed, minimum supported data rate of the fixed data rate data stream and the dynamic channelization code being dynamically allocated based on a required spreading factor for the variable rate data stream, and the variable rate data stream comprising the respective second portions of the frame.

6. A wireless communication system, comprising:
    a channel mapper for:
        receiving a variable rate data frame;
        apportioning the variable rate data frame into a primary data block and one or more secondary data blocks delayed with respect to the primary data block, the primary data block sized for transmission at a fixed, minimum supported data rate, the one or more secondary data blocks comprising the remainder of the variable rate data frame;
        determining one or more secondary rates in accordance with the one or more secondary data blocks;
        forming a primary data frame comprising the primary data block and an indicator identifying a dynamic channelization code associated with at least one of the secondary rates, wherein the dynamic channelization code shares code space with a fixed channelization code associated with the fixed, minimum supported data rate of the primary data block and the dynamic channelization code being dynamically allocated based on a required spreading factor for the variable rate data frame; and
        forming one or more secondary data frames comprising the one or more secondary blocks; respectively.

7. A wireless communication system, comprising:
    a receiver for receiving over a first fixed data rate data channel a primary data frame comprising a primary data block at a fixed, minimum supported data rate and an indicator and for receiving over a second variable rate channel a secondary data block of a secondary rate delayed with respect to the primary data block and according to the indicator identifying a dynamic channelization code associated with the secondary rate, the primary data block and the secondary data block forming at least a portion of a variable rate data frame, wherein the dynamic channelization code shares code space with a fixed channelization code associated with the fixed, minimum supported data rate of the first fixed data rate data channel and the dynamic channelization code being dynamically allocated based on a required spreading factor for the variable rate data frame.

8. A method for transmitting a variable rate data frame, comprising:
    apportioning the variable rate data frame into a primary data block and one or more secondary data blocks delayed with respect to the primary data block, the primary data block sized for transmission at a fixed, minimum supported data rate, the one or more secondary data blocks comprising the remainder of the variable rate data frame;
    determining one or more secondary rates in accordance with the one or more secondary data blocks;

forming a primary data frame comprising the primary data block and an indicator identifying a dynamic channelization code associated with at least one of the secondary rates, wherein the dynamic channelization code shares code space with a fixed channelization code associated with the fixed, minimum supported data rate of the primary data block and the dynamic channelization code being dynamically allocated based on a required spreading factor for the variable rate data frame; and forming one or more secondary data frames comprising the one or more secondary blocks, respectively.

9. The method of claim 8, further comprising:
transmitting the primary data frame on a primary channel with the fixed channelization code associated with the fixed, minimum supported data rate; and
transmitting the one or more secondary data frames on one or more secondary channels with codes associated with the one or more secondary rates, respectively.

10. A method for receiving a variable rate signal, comprising:
receiving over a first fixed data rate data channel a primary data frame comprising a primary data block a fixed, minimum supported data rate and an indicator; and
receiving over a second variable rate channel a secondary data block of a secondary rate delayed with respect to the primary data block and according to the indicator identifying a dynamic channelization code associated with the secondary rate, the primary data block and the secondary data block forming at least a portion of a variable rate data frame, wherein the dynamic channelization code shares code space with a fixed channelization code associated with the fixed, minimum supported data rate of the first fixed data rate data channel and the dynamic channelization code being dynamically allocated based on a required spreading factor for the variable rate data frame.

11. The method of claim 10, further comprising combining a frame of data from the first fixed data rate data channel with a frame of data from the second variable rate channel to form the variable rate data frame.

12. A method for generating primary and secondary data streams, comprising:
partitioning a source variable rate data stream into a fixed data rate data stream and a variable rate data stream, each frame of the fixed data rate data stream comprising a first portion of a frame of the source variable rate data stream and an indicator identifying a dynamic channelization code associated with a corresponding second portion of the frame, the first portion of the frame delayed with respect to the second portion, wherein the dynamic channelization code shares code space with a fixed channelization code associated with a fixed, minimum supported data rate of the fixed data rate data stream and the dynamic channelization code being dynamically allocated based on a required spreading factor for the variable rate data stream, the variable rate data stream comprising the respective second portions of the frame.

13. A method for transmitting a variable rate signal comprising a plurality of frames, the rate of each frame corresponding to one of a plurality of supported rates, the method comprising:
identifying a first portion of a variable data rate frame suitable for transmission at a lowest supported fixed data rate, the first portion being the entire variable data rate frame when the data frame rate is the lowest supported rate;

transmitting the first portion of the variable data rate frame on a first channel with a fixed code, the rate of the fixed code being the lowest supported fixed data rate;
determining a second code such that the rate of the second code is sufficient to transmit a second portion of the variable data rate frame when the frame rate is greater than the lowest supported fixed data rate, the first portion delayed with respect to the second portion;
transmitting a code indicator on the first channel, the code indicator identifying the second code when the frame rate is greater than the lowest supported fixed data rate, and wherein the fixed code shares code space with the second code and the second code being dynamically allocated based on a required spreading factor for the variable rate data frame, and indicating no second code when the frame rate is equal to the lowest supported fixed data rate; and
transmitting the second portion of the variable data rate frame on a second channel in accordance with the second code when the frame rate is greater than the lowest supported fixed data rate.

14. The method of claim 13, wherein the second portion of the variable data rate frame is the remainder of the variable data rate frame without the first portion.

15. The method of claim 13, further comprising:
identifying one or more third portions of the variable data rate frame, the one or more third portions comprising the remainder of the variable data rate frame without the first and second portions;
determining one or more third codes, the rates of which are suitable for transmission of the one or more third portions of the variable data rate frame, respectively;
transmitting the one or more third portions of the variable data rate frame on one or more third channels in accordance with the one or more third codes, respectively; and
transmitting a second code indicator on the second channel, the second code indicator identifying one or more of the third codes.

16. The method of claim 15, further comprising transmitting a third code indicator identifying one or more of the third codes on one or more of the third channels.

17. A method for receiving a variable rate signal comprising a plurality of data frames, the rate of each data frame corresponding to one of a plurality of supported rates, the method comprising:
receiving a first portion of a variable data rate frame on a first channel with a fixed first code, the rate of the first fixed code being a lowest supported fixed data rate;
decoding a code indicator from the received first portion of the variable data rate frame, the code indicator identifying a second code when the frame rate is greater than the lowest supported fixed data rate and indicating the received first portion of the variable data rate frame is the entire frame when the frame rate is the lowest supported fixed data rate, and wherein the fixed first code shares code space with the second code and the second code being dynamically allocated based on a required spreading factor for the variable rate data frame; and
receiving a second portion of the variable data rate frame on a second channel in accordance with the second code when the code indicator identifies a second code, the first portion delayed with respect to the second portion.

18. The method of claim 17 further comprising:
decoding a second code indicator from the received second portion of the data frame, the second code indicator identifying one or more third codes; and receiving one or more third portions of the data frame on one or more third channels in accordance with the one or more third codes, respectively.

19. An apparatus, comprising:

means for apportioning a variable rate data frame into a primary data block and one or more secondary data blocks, the primary data block sized for transmission at a fixed, minimum supported data rate, the one or more secondary data blocks delayed with respect to the primary data block and comprising the remainder of the variable rate data frame;

means for determining one or more secondary rates in accordance with the one or more secondary data blocks;

means for forming a primary data frame comprising the primary data block and an indicator identifying a dynamic channelization code associated with at least one of the secondary rates, wherein the dynamic channelization code shares code space with a fixed channelization code associated with the fixed, minimum supported data rate of the primary data block and the dynamic channelization code being dynamically allocated based on a required spreading factor for the variable rate data frame; and means for forming one or more secondary data frames comprising the one or more secondary blocks, respectively.

20. An apparatus, comprising:

means for receiving over a first fixed data rate data channel a primary data frame comprising a primary data block at a fixed, minimum supported data rate and an indicator; and means for receiving over a second variable rate channel a secondary data block of a secondary rate delayed with respect to the primary data block and according to the indicator identifying a dynamic channelization code associated with the secondary rate, the primary data block and the secondary data block forming at least a portion of a variable rate data frame, wherein the dynamic channelization code shares code space with a fixed channelization code associated with the fixed, minimum supported data rate of the first fixed data rate data channel and the dynamic channelization code being dynamically allocated based on a required spreading factor for the variable rate data frame.

21. An apparatus, comprising:

means for partitioning a source variable rate data stream into a fixed data rate data stream and a variable rate data stream, each frame of the fixed data rate data stream comprising a first portion of a frame of the source variable rate data stream and an indicator identifying a dynamic channelization code associated with a corresponding second portion of the variable rate data frame, the first portion of the frame delayed with respect to the second portion, wherein the dynamic channelization code shares code space with a fixed channelization code associated with a fixed, minimum supported data rate of the fixed data rate data stream and the dynamic channelization code being dynamically allocated based on a required spreading factor for the variable rate data stream, the variable rate data stream comprising the respective second portions of the frame.

22. A wireless communication system, comprising:

means for apportioning a variable rate data frame into a primary data block and one or more secondary data blocks delayed with respect to the primary data block, the primary data block sized for transmission at a fixed, minimum supported data rate, the one or more secondary data blocks comprising the remainder of the variable rate data frame;

means for determining one or more secondary rates in accordance with the one or more secondary data blocks;

means for forming a primary data frame comprising the primary data block and an indicator identifying a dynamic channelization code associated with at least one of the secondary rates, wherein the dynamic channelization code shares code space with a fixed channelization code associated with the fixed, minimum supported data rate of the primary data block and the dynamic channelization code being dynamically allocated based on a required spreading factor for the variable rate data frame; and means for forming one or more secondary data frames comprising the one or more secondary blocks, respectively.

23. A wireless communication system, comprising:

means for receiving over a first fixed data rate data channel a primary data frame comprising a primary data block at a fixed, minimum supported data rate and an indicator; and means for receiving over a second variable rate channel a secondary data block of a secondary rate delayed with respect to the primary data block and according to the indicator identifying a dynamic channelization code associated with the secondary rate, the primary data block and the secondary data block forming at least a portion of a variable rate data frame, wherein the dynamic channelization code shares code space with a fixed channelization code associated with the fixed, minimum supported data rate of the first fixed data rate data channel and the dynamic channelization code being dynamically allocated based on a required spreading factor for the variable rate data frame.

24. A wireless communication system, comprising:

means for partitioning a source variable rate data stream into a fixed data rate data stream and a variable rate data stream, each frame of the fixed data rate data stream comprising a first portion of a frame of the source variable rate data stream and an indicator identifying a dynamic channelization code associated with a corresponding second portion of the variable rate data frame, the first portion of the frame delayed with respect to the second portion, wherein the dynamic channelization code shares code space with a fixed channelization code associated with a fixed, minimum supported data rate of the fixed data rate data stream and the dynamic channelization code being dynamically allocated based on a required spreading factor for the variable rate data stream, the variable rate data stream comprising the respective second portions of the frame.

25. Non-transitory processor readable media operable to perform the following steps:

apportioning a variable rate data frame into a primary data block and one or more secondary data blocks delayed with respect to the primary data block, the primary data block sized for transmission at a fixed, minimum supported data rate, the one or more secondary data blocks comprising the remainder of the variable rate data frame;

determining one or more secondary rates in accordance with the one or more secondary data blocks;

forming a primary data frame comprising the primary data block and an indicator identifying a dynamic channelization code associated with at least one of the secondary rates, wherein the dynamic channelization code shares code space with a fixed channelization code associated with the fixed, minimum supported data rate of the primary data block and the dynamic channelization code being dynamically allocated based on a required spreading factor for the variable rate data frame; and forming one or more secondary data frames comprising the one or more secondary blocks, respectively.

26. Non-transitory processor readable media operable to perform the following steps:

receiving over a first fixed data rate data channel a primary data frame comprising a primary data block at a fixed, minimum supported data rate and an indicator; and receiving over a second variable rate channel a secondary data block of a secondary rate delayed with respect to the primary data block and according to the indicator identifying a dynamic channelization code associated with the secondary rate, the primary data block and the secondary data block forming at least a portion of a variable rate data frame, wherein the dynamic channelization code shares code space with a fixed channelization code associated with the fixed, minimum supported data rate of the first fixed data rate data channel and the dynamic channelization code being dynamically allocated based on a required spreading factor for the variable rate data frame.

27. Non-transitory processor readable media operable to perform the following steps:

partitioning a source variable rate data stream into a fixed data rate data stream and a variable rate data stream, each frame of the fixed data rate data stream comprising a first portion of a frame of the source variable rate data stream and an indicator identifying a dynamic channelization code associated with a corresponding second portion of the variable rate data frame, the first portion of the frame delayed with respect to the second portion, wherein the dynamic channelization code shares code space with a fixed channelization code associated with a fixed, minimum supported data rate of the fixed data rate data stream and the dynamic channelization code being dynamically allocated based on a required spreading factor for the variable rate data stream, the variable rate data stream comprising the respective second portions of the frame.

* * * * *